United States Patent [19]

Rogers

[11] 4,193,383

[45] Mar. 18, 1980

[54] VACUUM OPERATED VALVE ARRANGEMENT

[75] Inventor: David W. Rogers, Rochester, N.Y.

[73] Assignee: General Motors Corporation, Detroit, Mich.

[21] Appl. No.: 928,381

[22] Filed: Jul. 27, 1978

[51] Int. Cl.$^2$ .................... F02M 59/00; F16K 31/365; B01D 50/00

[52] U.S. Cl. .................................... 123/136; 251/61.4; 55/316; 220/85 VR

[58] Field of Search ................. 123/136; 137/DIG. 8; 251/61.4, 28; 55/316, 387, 419, 420, 476, DIG. 28; 220/85 VR, 85 VS

[56] References Cited

U.S. PATENT DOCUMENTS

| | | | |
|---|---|---|---|
| 1,912,203 | 5/1933 | Hueber et al. | 123/136 |
| 3,322,142 | 5/1967 | Baumann | 251/61.4 |
| 3,628,517 | 12/1971 | Soberski | 123/136 |
| 3,683,597 | 8/1972 | Beveridge et al. | 123/136 |
| 3,752,134 | 8/1973 | Hollis, Jr. | 123/136 |
| 3,986,353 | 10/1976 | Otsubo et al. | 251/61.4 |
| 4,137,882 | 2/1979 | Thornburgh | 123/136 |

FOREIGN PATENT DOCUMENTS

| | | | |
|---|---|---|---|
| 2556738 | 6/1976 | Fed. Rep. of Germany | 137/DIG. 8 |
| 290525 | 10/1971 | U.S.S.R. | 137/DIG. 8 |

OTHER PUBLICATIONS

"Evaporative Emision Control System" (EECS) from Buick Chassis Manual, 1978, pp. 6c-65, 66.

*Primary Examiner*—Charles J. Myhre
*Assistant Examiner*—P. S. Lall
*Attorney, Agent, or Firm*—Ronald L. Phillips

[57] ABSTRACT

In an evaporative control system for reducing emission of fuel vapors from an engine fuel system there is provided a vacuum operated valve arrangement having a two-position valve which is spring biased to open to permit venting of fuel vapor from a carburetor fuel bowl to a carbon canister when the engine is not running and is responsive to engine vacuum only above a predetermined negative pressure to close to prevent such venting when the engine is running, and a check valve and bleed valve arrangement which is operable to trap engine vacuum at the two-position valve at a vacuum at or above the predetermined negative pressure whenever the engine vacuum drops below such pressure to thereby maintain the two-position valve in its closed position preventing fuel vapor venting during engine running at low engine vacuum and operating to release the trapped engine vacuum at the two-position valve to thereby permit the valve to open to permit fuel vapor venting when the engine is not running.

9 Claims, 4 Drawing Figures

VACUUM OPERATED VALVE ARRANGEMENT

This invention relates to a vacuum operated valve arrangement and more particularly to a vacuum operated valve arrangement for an evaporative control system used to reduce emission of fuel vapors from an engine fuel system and for other systems having similar valve requirements.

In two-position valves of the type having a pressure responsive diaphragm operating against a spring bias to effect valve movement to one of its positions, there is normally required a minimum vlave operating pressure. Generally, this presents no problem; however, there are applications where the valve operating pressure may fall below the minimum requirement. For example, in an evaporative control system for reducing emission of fuel vapors from an engine fuel system, a valve of this type operated by engine vacuum may be used to control venting of fuel vapor from a part of the fuel system such as the carburetor fuel bowl to a carbon canister where it is stored for later burning in the engine. In such an application, the so-called fuel vapor vent valve is normally spring biased to open to permit venting of fuel vapor when the engine is not running and is responsive to engine vacuum to close to prevent such venting when the engine is running. In such a system, it is desirable that the vent valve remain closed during engine operation since otherwise such venting could disturb the normal venting of the carburetor fuel bowl and result in an improper mixture. Normally, engine vacuum will remain high enough to maintain vent valve closure, but there has been observed instances such as during high load vehicle maneuvers where the engine vacuum drops below the responsiveness level of the valve thus permitting the valve to open, which as discussed above, is undesirable.

According to the present invention, a check valve and bleed valve arrangement is combined with a vacuum operated two-position valve to extend the operating ability thereof so as to continue functioning properly when the vacuum for operating the valve drops below the responsiveness level thereof. In respect to use in an evaporative emission control sytem for an engine fuel system, the check valve permits normal communication between the source of engine vacuum and the vacuum chamber of a vent valve above a predetermined negative pressure while the bleed valve is then closed by the engine vacuum to prevent communication between atmosphere and this chamber so that vacuum is established therein and acts on the vent valve diaphragm to close the vent valve. However, if engine vacuum should drop below the predetermined negative pressure, the check valve closes to trap the vacuum in the vent valve vacuum chamber while the bleed valve continues to be held closed by the lower vacuum to thereby maintain the vent valve in its closed position. Thereafter, if engine vacuum rises above the minimum value, the check valve opens to again communicate the source of engine vacuum with the vent valve vacuum chamber while the bleed valve remains closed to restore the normal control and maintain the vent valve in its closed position. Alternatively, when the engine is shutoff the bleed valve opens in response to the lack of any engine vacuum to expose the vent valve vacuum chamber to atmosphere allowing the spring bias to move the vent valve to its open position allowing venting of fuel vapor from the carburetor fuel bowl to the carbon canister.

An object of the present invention is to provide a new and improved vacuum operated valve arrangement.

Another object is to provide a vacuum operated valve arrangement which will continue to function properly below the normal vacuum responsiveness level thereof.

Another object is to provide a vacuum operated valve arrangement having a two-position valve responsive to operate with vacuum above a certain negative pressure and an auxiliary valve arrangement for trapping and maintaining vacuum at the two-position valve when the vacuum available drops below such pressure and releasing the trapped vacuum when the vacuum available reaches zero.

Another object is to provide a vacuum operated valve arrangement having a two-position valve which is normally spring biased to open in the absence of vacuum and is responsive to vacuum above a predetermined negative pressure to close and an auxiliary valve arrangement which is operable below such negative pressure to trap and maintain sufficient vacuum at the two-position valve to maintain valve closure and release the trapped vacuum to permit valve opening in the absence of any vacuum applied to the valve arrangement.

Another object is to provide in an evaporative emission control system for reducing emissions of fuel vapor from an engine fuel system, a vent valve which is normally biased to open to permit venting of fuel vapor from the fuel system to a fuel vapor storage vessel when the engine is not running and is responsive to engine vacuum only above a predetermined negative pressure to prevent such venting when the engine is running and an auxiliary valve arrangement which operates to trap vacuum at the vent valve at a vacuum at or above the predetermined negative pressure when the engine vacuum drops below such pressure to thereby maintain the vent valve in its closed position preventing venting during engine running at low engine vacuum, but releasing the trapped engine vacuum at the vent valve to thereby permit its opening when the engine is not running to allow vapor venting and storage.

Another object is to provide in an evaporative emission control system for reducing fuel vapor emissions from an engine fuel system, an engine vacuum operated control valve arrangement having a vent valve which is normally spring biased to open to permit venting of fuel vapor from a carburetor fuel bowl to a fuel vapor storage vessel when the engine is not running and is responsive to engine vacuum only above a predetermined negative pressure to close to prevent such venting when the engine is running and a check valve and bleed valve arrangement which operates to trap engine vacuum at the vent valve at a vacuum at or above the predetermined pressure whenever the engine vacuum drops below such pressure to thereby maintain the vent valve in its closed position preventing venting during engine running at low engine vacuum, but releasing the trappped engine vacuum to thereby permit vent valve opening when the engine is not running.

These and other objects of the present invention will be more apparent from the following description and drawing in which.

Figure 1:
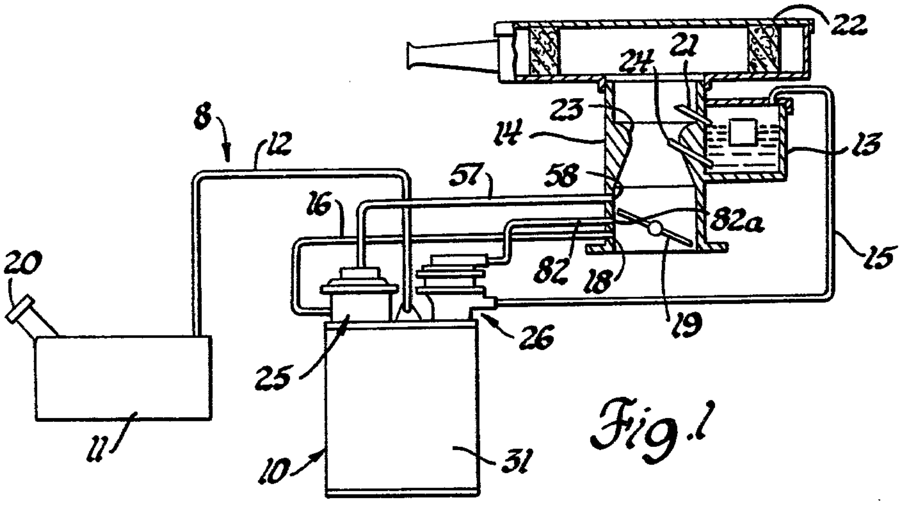
FIG. 1 is a schematic view of an evaporative control system for an engine fuel system having a fuel vapor storage canister in which is incorporated a vacuum operated valve arrangement according to the present invention.

Referring to FIG. 1, the present invention is shown in use in an evaporative control system generally designated as 8 which operates to reduce emission of fuel vapors from an engine fuel system in a vehicle. The evaporative control system 8 includes a fuel vapor storage canister 10 which, when the engine is not running, collects and stores fuel vapor from a fuel tank 11 through a hose 12 and from a fuel bowl 13 of a carburetor 14 through a hose 15. Then when the engine is running, the fuel vapor collected in the canister 10 is purged therefrom by the induction system through a hose 16 that is connected to the carburetor's throttle bore 18 downstream of its throttle valve 19. The fuel tank 11 has a sealed cap 20 and is vented through the evaporative control system 8 to the induction system during engine running. In contrast, the fuel bowl 13 is normally vented by a balance tube 21 in the carburetor which balances the pressure above the fuel with that at the air inlet downstream of the carburetor's air cleaner 22 and upstream of the venturi 23 where the fuel nozzle 24 is located so that the air flow and fuel delivery experience the same pressure drop to maintain correct proportionality, as is well known in the carburetor art.

Figure 2:
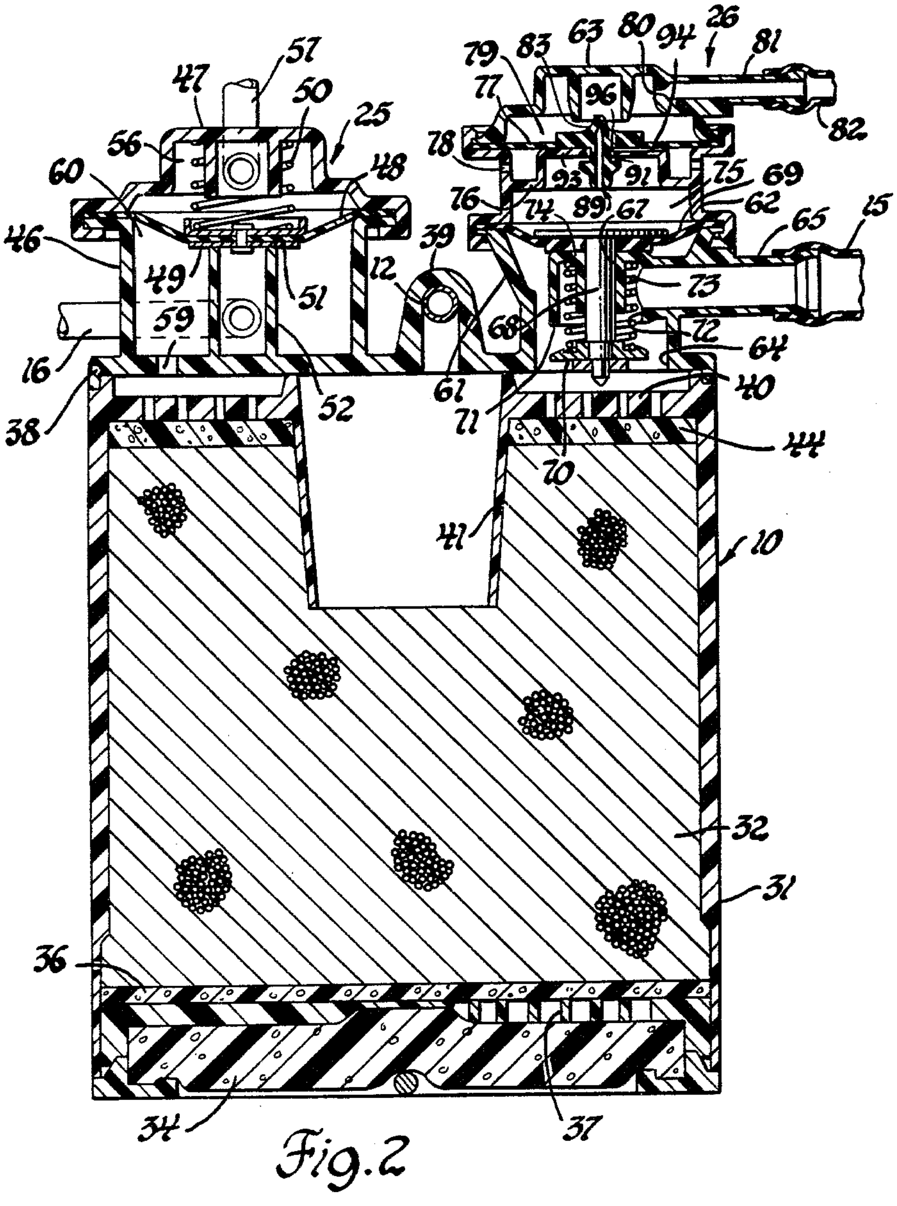
FIG. 2 is an enlarged sectional view of the vapor storage canister in FIG. 1 showing the vacuum operated valve arrangement with both its vent valve and bleed valve open and its check valve closed when the engine is not running.

A purge control valve 25 for controlling purging of the canister to the induction system and also a fuel bowl vapor vent valve 26 as provided by the vacuum operated valve arrangement according to the present invention for controlling venting of fuel vapors from the float bowl to the canister are both incorporated in the top of the canister 10. As shown in FIG. 2, the canister 10 comprises a cylindrical canister body 31 filled with a suitable fuel vapor adsorbing material 32 such as charcoal. At the bottom of the canister there is provided an exposed filter 34 and an interior filter 36 between which a grid 37 is located to permit the intake of atmospheric air into the charcoal. The top of the canister is sealingly closed by a cap 38 having an integrally formed and centrally located nipple 39 to which the hose 12 from the fuel tank 11 is connected. The canister body 31 has an interior annular grid 40 formed integrally therewith which underlies the cap 38 and has a central downwardly extending annular projection 41 providing an opening therethrough permitting passage of fuel vapor from the fuel tank via the hose 12 and nipple 39 into the body of charcoal. An annular shaped filter 44 is located between the top of the charcoal bed and the underside of the grid 40 which communicates the top of the charcoal bed with both the purge valve 25 and the fuel bowl vapor vent valve 26.

The purge valve 25 has a housing assembly comprising a cup-shaped lower portion 46 which is formed integrally with the top of the canister cap 38 and a cover 47. A diaphragm 48 has its perimeter sealingly retained between the lower housing portion 46 and the cover 47 which is secured by a flange joint to the lower housing portion. A circular valve member 49 is centrally secured to the lower side of diaphragm 48 and is urged by a spring 50 to seat on an annular valve seat 51 formed on an annular projection 52 that is integral with and projects up from the top of the canister cap 38 interior of the lower housing 46. The diaphragm 48 and cover 47 define a chamber 56 on the spring side of the diaphragm which is connected by a hose 57 to the carburetor's throttle bore 18 at a timed port 58 which is traversed by the throttle valve 19 on opening thereof as will be described in more detail later. A purge hole 59 through the canister top 38 interior of the lower housing portion 46 and exterior of the projection 52 communicates the top of the charcoal bed through grid 40 with the annular chamber 60 extending about the projection 52. The purge hose 16 is connected at the lower housing portion 46 to the interior of the projection 52 and is thus in communication with the purge hole 59 and thereby the charcoal bed when the purge valve 49 is opened and, alternatively, such communication is blocked when the valve is closed as shown.

Describing now the purge valve operation, the spring 50 normally holds the purge valve 49 against the valve seat 51 when the engine is not running and also when the engine is running but only during idle with the throttle valve 19 in the position shown where the vacuum at the timed vacuum port 58 above the throttle valve is not sufficient to overcome the spring bias. But then as the throttle valve passes by the timed vacuum port 58 to increase engine speed, the vacuum then developed at this port and thus in chamber 56 is sufficient to lift the purge valve 49 off its seat whereupon the fuel stored in the charcoal bed is then purged by air under vacuum being drawn up through the charcoal bed 32 and the purge hole 59 through the open purge valve and out through the hose 16 to the throttle bore downstream of the throttle valve. In this way, fuel vapors are thus combined with the increased air/fuel rate of the carburetor and are burned rather than being permitted to reach atmosphere.

Figure 3:
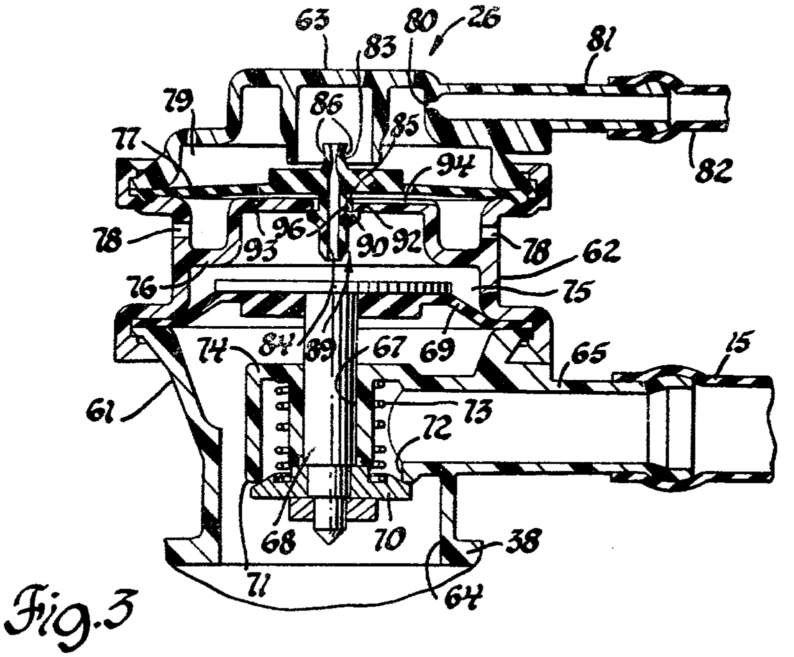
FIG. 3 is a view similar to FIG. 2 but showing both the control valve and bleed valve closed and the check valve open during engine running.
Figure 4:
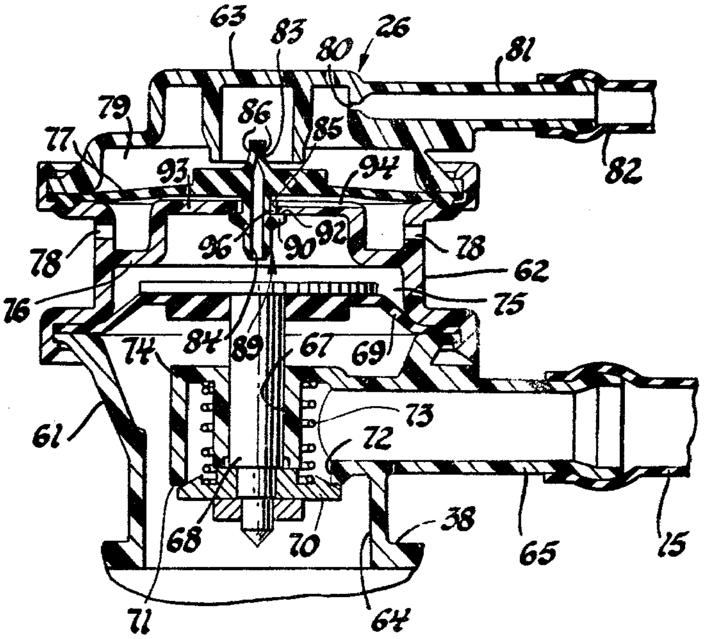
FIG. 4 is a view similar to FIG. 3 but showing the vent valve, bleed valve and check valve all closed during engine running.

Describing now the fuel bowl vapor vent valve 26, the housing thereof comprises three parts; namely, a cup-shaped lower portion 61 which is formed integrally with the top of the canister cap 38, an intermediate part 62 and a cover 63. The lower housing portion 61 has an opening 64 in its bottom through the canister cap 38 above the grid 40 and also a nipple 65 formed integral with its side to which the hose 15 from the carburetor fuel bowl is connected. The nipple 65 extends internally of the lower housing portion 61 and has a vertical valve guide 67 formed thereon in which a valve stem 68 is reciprocably mounted. The valve stem 68 is connected at its upper end to the center of a vent valve diaphragm 69 that is sealingly secured at its perimeter between the lower housing portion 61 and the intermediate housing part 62 which is secured by a flange joint to the lower housing portion. A circular valve element 70 is secured to the lower end of the valve stem 68 and is seatable with an annular valve seat 71 surrounding an interior downwardly facing open end 72 of the nipple 65. A coil spring 73 surrounding the valve stem guide 67 is seated on a horizontally extending wall 74 of the inward extension of the nipple 65 and engages the valve 70 to normally lift it off the valve seat 71 and urge it to the open position shown in FIG. 2 where it opens the carburetor fuel bowl to the top of the charcoal bed. Movement of the vent valve 70 to a closed position as shown in FIGS. 3 and 4 to close such communication is effected by evacuating a vent valve vacuum chamber 75 defined by the vent diaphragm 69 and the interior of intermediate housing part 62 including a wall 76 which is integrally formed therewith and extends across the interior thereof.

Control of vacuum in the vent valve vacuum chamber 75 is provided by a bleed valve and check valve arrangement comprising a bleed valve diaphragm 77 that is sealingly secured at its perimeter between the intermediate housing 62 and the cover 63 which is secured by a flange joint to the intermediate housing. The lower side of diaphragm 77 is exposed to atmosphere through bleed ports 78 through the exterior of the intermediate housing part 62 above wall 76 and the upper side of the diaphragm in cooperation with the cover 63 and defines a vacuum signal chamber 79 which opens through an orifice 80 to a nipple 81 formed integral with the cover. A vacuum signal hose 82 is connected at one end to the nipple 81 and is connected at its other end to a vacuum port **82*a* in the carburetor throttle bore 18 downstream of the throttle valve 19** so as to always experience intake manifold or engine vacuum.

A check valve 83 for communicating the vacuum signal chamber 79 with the vent valve vacuum chamber 75 is formed integral with and projects up from the upper side of the bleed valve diaphragm 77 at the center thereof and is connected by a central passage 84 through the diaphragm and through a central opening 85 in the intermediate housing wall 76 with the vent valve vacuum chamber 75. The check valve 83 is of the so-called duck-bill type having lips 86 which are normally closed as shown in FIG. 2 and deflect to open as shown in FIG. 4 when they experience an internal pressure greater than the external pressure acting thereon as is well known in the valve art. In addition, a bleed valve 89 for communicating the vent valve vacuum chamber 75 with atmosphere is formed integral with and projects down from the lower side of the bleed valve diaphragm 77. The bleed valve 89 extends about the check valve passage 84 and has an annular valve head 90 which is squeezably insertable through the intermediate housing wall opening 85 whereafter the valve head 90 retains the bleed valve diaphragm to the wall 76 while permitting limited diaphragm and bleed valve movement according to a predetermined valve opening clearance 91 determined by the distance between an annular valve face 92 on the upper side of valve head 90 and the bottom side of diaphragm 77 being greater by a predetermined amount than the thickness of wall 76. The upper side of a central raised portion 93 of wall 76 is provided with one or more radially extending channels 94 where the bleed valve diaphragm 77 is seatable thereagainst to maintain communication between the atmospheric bleed ports 78 and an annular clearance 96 provided between the bleed valve 89 and the opening 85 in the raised wall portion 93 when the diaphragm rests on the raised wall portion. When there is no vacuum in the vacuum signal chamber 79, i.e., there is atmospheric pressure, there is thus no pressure differential acting on the bleed valve diaphragm 77 and it assumes the position shown in FIG. 2 where it rests on the upper side of the raised wall portion 93 while the bleed valve's valve face 92 is spaced from the lower side thereof according to the valve opening clearance 91 to thus communicate the vent valve vacuum chamber 75 with atmosphere via clearances 91 and 96, channels 94 and bleed ports 78. Alternatively, when vacuum is applied to the vacuum signal chamber 79 the upwardly acting pressure differential then on the bleed valve diaphragm 77 will lift it upward to the postion shown in FIGS. 3 and 4 where the bleed valve's valve face 92 seats against the lower side of the raised wall portion 93 adjacent the opening 85, thus blocking atmospheric communication with the vent valve vacuum chamber 75.

Describing now the operation of the carburetor fuel bowl vent valve arrangement 26, when the engine is not running and there is thus no vacuum applied to the vacuum signal chamber 79, the check valve 83 is closed and the bleed valve 89 is open and the vent valve spring 73 holds the vent valve 70 in its open position shown in FIG. 2 allowing fuel vapors from the carburetor fuel bowl 13 to flow into the charcoal bed 32 where they are absorbed and thus stored for later engine burning by operation of the purge valve 25 as previously described. Then when the engine is started as shown in FIG. 3, engine vacuum in the vacuum signal chamber 79 operates on the upper side of the bleed valve diaphragm 77 while atmospheric pressure exists on the other side thereof resulting in an upwardly acting pressure differential forcing upward movement of the bleed valve diaphragm to close the bleed valve face 92 against its valve seat 93 and thereby seal the vent valve vacuum chamber 75 from atmosphere. At the same time, the vacuum in the vacuum signal chamber 79 acts on the check valve 83 establishing a sufficient pressure differential thereon to effect its opening whereby engine vacuum is thus applied to the vent valve vacuum chamber 75 and thus to the upper side of the vent valve diaphragm 69 while atmospheric pressure communicated through the charcoal bed acts on the other side thereof. This upwardly acting pressure differential on the vent valve diaphragm 69 forces it to move upward against the bias of spring 73 closing the vent valve 70 on its seat 71 and thereby preventing venting of fuel vapors from the fuel bowl to the charcoal bed when the engine is running.

Normally, engine vacuum will be sufficient to maintain the vent valve 70 in its closed position to prevent venting of the fuel bowl during engine running. However, should engine vacuum drop to a very low negative pressure during certain engine operating conditions to the point where it would be insufficient to overcome the force of spring 73, the check valve 83 is calibrated to then close in response to such a drop in engine vacuum while the bleed valve diaphragm is calibrated to maintain its bleed valve closing condition down to the lowest predicted engine vacuum to thus trap and hold vacuum in the vent valve vacuum chamber 75 at a negative pressure sufficiently high enough to maintain the vent valve 70 in its closed position as shown in FIG. 4. For example, the vent valve diaphragm 69 may require a minimum of about 1" Hg. vacuum to maintain the vent valve 70 in its closed position whereas engine vacuum may drop to as low as 0.5" Hg. vacuum during certain engine operating conditions such as during high load vehicle maneuvers and such lower negative pressure would permit the vent valve to open. Accordingly, the check valve 83 would in that case be calibrated to close when engine vacuum drops close to 1" Hg. vacuum while the bleed valve diaphragm is calibrated to maintain closure of the bleed valve 90 down to at least 0.5" Hg. vacuum and thereby there is maintained sufficient vacuum, i.e., at or above 1" Hg. vacuum, in the vent valve vacuum chamber 75 to maintain vent valve closure. Thereafter, when the engine vacuum rises above the check valve closure setting after such a low negative pressure excursion, the check valve 83 again opens while the bleed valve remains closed to relinquish the holding of the vent valve in its closed position to the higher engine vacuum as shown in FIG. 3. Finally, when the engine is shutoff and as the vacuum approaches zero, i.e., atmospheric pressure, the check valve 83 will close but thereafter the bleed valve diaphragm 77 responds to the lowering vacuum to open the bleed valve 89 to thus vent the vent valve vacuum chamber 75 and permit the spring 73 to move the vent valve to its open position.

While the vacuum operated valve arrangement according to the present invention has been described in use as a fuel bowl vapor vent valve in an engine's evaporative emission control system, it will of course, be obvious to those skilled in the art that it also has application in other systems where there may be a decrease in the vacuum signal supplied thereto such that a conventional valve would be incapable of continuing to provide the desired valve operation. Furthermore, it will be obvious that while the check valve and bleed valve have been shown as an integrated compact structure, they may also be separately arranged to suit a particular application.

The above-described embodiments are illustrative of the invention which may be modified within the scope of the appended claims.

The embodiments of the invention in which an exclusive property or privilege is claimed are defined as follows:

1. In a vacuum operated valve arrangement the combination of a two-position valve movable between two positions, a spring urging said two-position valve toward one of said positions, vacuum responsive means responsive to vacuum from a source at a pressure above a predetermined negative pressure to move said two-position valve against said spring to the other of said positions, and valve means for trapping the vacuum at said vacuum responsive means at a pressure above said predetermined negative pressure to maintain said two-position valve in said other position whenever the pressure at the source drops below said predetermined pressure but releasing the trapped vacuum when the pressure at the source reaches atmospheric pressure to permit said two-position valve to be spring biased to said one position.

2. A vacuum operated valve arrangement comprising a housing having an inlet, an outlet, a vacuum port connectable to a source of vacuum and a bleed port that is open to atmosphere, a two-position valve mounted in said housing for movement between an open position opening said inlet to said outlet and a closed position closing said outlet to said inlet, a spring arranged in said housing to bias said two-position valve to one of said positions, a first vacuum chamber in said housing defined in part by a first diaphragm that is exposed to atmosphere and is connected to said two-position valve, said first diaphragm being responsive to the presence of vacuum in said first vacuum chamber to urge said two-position valve towards the other of said positions against the spring bias, a bleed valve mounted in said housing for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is connected to said bleed valve, said second diaphragm in the absence of vacuum in said second vacuum chamber locating said bleed valve in its open position and being responsive to the establishment of vacuum in said second vacuum chamber to move said bleed valve to its closed position, and a check valve mounted in said housing responsive to vacuum at said vacuum port to open said first vacuum chamber to said vacuum port when the vacuum rises above a predetermined negative pressure and to close said first vacuum chamber to said vacuum port when the vacuum falls below said predetermined negative pressure.

3. A vacuum operated valve arrangement comprising a housing having an inlet, an outlet, a vacuum port connectable to a source of vacuum and a bleed port that is open to atmosphere, a two-position valve mounted in said housing for movement between an open position opening said inlet to said outlet and a closed position closing said outlet to said inlet, a spring arranged in said housing to bias said two-position valve to its open position, a first vacuum chamber in said housing defined in part by a first diaphragm that is exposed to atmosphere and is connected to said two-position valve, said first diaphragm being responsive to the presence of vacuum in said first vacuum chamber above a predetermined negative pressure to urge said two-position valve to its closed position against the spring bias, a bleed valve mounted in said housing for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is connected to said bleed valve, said second diaphragm in the absence of vacuum in said second vacuum chamber locating said bleed valve in its open position and being responsive to the establishment of vacuum in said second vacuum chamber above and also below said predetermined negative pressure to move said bleed valve to its closed position, and a check valve mounted in said housing responsive to vacuum at said vacuum port to open said first vacuum chamber to said vacuum port when the vacuum rises above said predetermined negative pressure and to close said first vacuum chamber to said vacuum port when the vacuum falls below said predetermined negative pressure whereby on the establishment of vacuum at the vacuum port above said predetermined negative pressure the check valve opens while the bleed valve closes to establish the same vacuum in the first vacuum chamber and thereby close the two-position valve but whenever the vacuum at the vacuum port thereafter drops below the predetermined negative pressure the check valve closes while the bleed valve remains closed to trap the vacuum in the first vacuum chamber at a pressure above the predetermined negative pressure to maintain closure of the two-position valve until there is no vacuum at the vacuum port whereafter the bleed valve opens to establish atmospheric pressure in the first vacuum chamber and thereby permit movement of the two-position valve to its open position by the spring bias.

4. A vacuum operated valve arrangement comprising a housing having an inlet, an outlet, a vacuum port connectable to a source of vacuum and a bleed port that is open to atmosphere, a two-position valve mounted in said housing for movement between an open position opening said inlet to said outlet and a closed position closing said outlet to said inlet, a spring arranged in said housing to bias said two-position valve to its open position, a first vacuum chamber in said housing defined in part by a first diaphragm that is exposed to atmosphere and is connected to said two-position valve, said first diaphragm being responsive to the presence of vacuum in said first vacuum chamber above a predetermined negative pressure to urge said two-position valve to its closed position against the spring bias, a bleed valve mounted for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is integrally connected to said bleed valve, said second diaphragm in the absence of vacuum in said second vacuum chamber locating said bleed valve in its open position and being responsive to the establishment of vacuum in said second vacuum chamber above and also below said predetermined negative pressure to move said bleed valve to its closed position, and a check valve integral with said second diaphragm responsive to vacuum at said vacuum port to open said first vacuum chamber to said vacuum port when the vacuum rises above said predetermined negative pressure and to close said first vacuum chamber to said vacuum port when the vacuum falls below said predetermined negative pressure whereby on the establishment of vacuum at the vacuum port above said predetermined negative pressure the check valve opens while the bleed valve closes to establish the same vacuum in the first vacuum chamber and thereby close the two-position valve but whenever the vacuum at the vacuum port thereafter drops below the predetermined negative pressure the check valve closes while the bleed valve remains closed to trap the vacuum in the first vacuum chamber at a pressure above the predetermined negative pressure to maintain closure of the two-position valve until there is no vacuum at the vacuum port whereafter the bleed valve opens to establish atmospheric pressure in the first vacuum chamber and thereby permit movement of the two-position valve to its open position by the spring bias.

5. In an evaporate emission control system for a fuel system of an internal combustion engine, fuel vapor storage means for collecting and storing fuel vapor for later burning in the engine, vapor vent valve means normally biased to open to permit venting of fuel vapor from the fuel system to said storage means when the engine is not running and responsive to engine vacuum only above a predetermined negative pressure to close to prevent such venting when the engine is running, and vacuum trap-release valve means for trapping vacuum at said vent valve means at a pressure above said predetermined negative pressure whenever engine vacuum drops below said predetermined negative pressure to thereby maintain venting prevention during engine running at lower engine vacuum and releasing the trapped vacuum to thereby permit venting when the engine is not running.

6. In an evaporate emission control system for an internal combustion engine supplied with air-fuel mixture by a carburetor having a fuel bowl, fuel vapor storage means for collecting and storing fuel vapor for later burning in the engine, fuel bowl vapor vent valve means normally biased to open to permit venting of fuel vapor from the fuel bowl to said storage means when the engine is not running and responsive to engine vacuum only above a predetermined negative pressure to close to prevent such venting when the engine is running, and vacuum trap-release valve means for trapping vacuum at said vent valve means at a pressure above said predetermined negative pressure whenever engine vacuum drops below said predetermined negative pressure to thereby maintain venting prevention during engine running at lower engine vacuum and releasing the trapped vacuum to thereby permit venting when the engine is not running.

7. In an evaporative emission control system for an internal combustion engine supplied with air-fuel mixture by a carburetor having a fuel bowl, fuel vapor storage means for collecting and storing fuel vapor for later burning in the engine, and a vacuum operated fuel bowl vapor vent valve arrangement for controlling communication between the carburetor fuel bowl and said storage means comprising a housing having an inlet adapted to receive fuel vapor from the carburetor fuel bowl, an outlet connected to deliver fuel vapor to said fuel vapor storage means, a vacuum port and a bleed port that is open to atmosphere, a vent valve mounted in said housing for movement between an open position opening said inlet to said outlet to permit fuel vapor flow to said storage means and a closed position closing said outlet to said inlet to prevent such flow, a spring arranged in said housing to bias said vent valve to its open position, a first vacuum chamber in said housing defined in part by a first diaphragm that is exposed to atmosphere and is connected to said vent valve, said first diaphragm being responsive to the presence of engine vacuum in said first vacuum chamber to urge said vent valve towards its closed position against the spring bias, a bleed valve mounted in said housing for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is connected to said bleed valve, said second diaphragm in the absence of engine vacuum in said second vacuum chamber locating said bleed valve in its open position and being responsive to the establishment of engine vacuum in said second vacuum chamber above and also below said predetermined negative pressure to move said bleed valve to its closed position, and a check valve mounted in said housing responsive to engine vacuum at said vacuum port to open said first vacuum chamber to said vacuum port when the engine vacuum rises above a predetermined negative pressure and to close said first vacuum chamber to said vacuum port when the engine vacuum falls below said predetermined negative pressure.

8. In an evaporative emission control system for an internal combustion engine supplied with air-fuel mixture by a carburetor having a fuel bowl, fuel vapor storage means for collecting and storing fuel vapor for later burning in the engine, a vacuum operated fuel bowl vapor vent valve arrangement for controlling communication between the carburetor fuel bowl and said storage means comprising a housing having an inlet adapted to receive fuel vapor from the carburetor fuel bowl, an outlet connected to deliver fuel vapor to said fuel vapor storage means, a vacuum port and a bleed port that is open to atmosphere, a vent valve mounted in said housing for movement between an open position opening said inlet to said outlet to permit fuel vapor flow to said storage means and a closed position closing said outlet to said inlet to prevent such flow, a spring arranged in said housing to bias said vent valve to its open position, a first vacuum chamber in said housing defined in part by a first diaphragm that is exposed to atmosphere and is connected to said vent valve, said first diaphragm being responsive to the presence of engine vacuum in said first vacuum chamber above a predetermined negative pressure to urge said vent valve to its closed position against the spring bias, a bleed valve mounted in said housing for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is connected to said bleed valve, said second diaphragm in the absence of engine vacuum in said second vacuum chamber locating said bleed valve in its open position and being responsive to the establishment of engine vacuum in said second vacuum chamber above and also below said predetermined negative pressure to move said bleed valve to its closed position, and a check valve mounted in said housing responsive to engine vacuum at said vacuum port to open said first vacuum chamber to said vacuum port when the engine vacuum rises above said predetermined negative pressure and to close said first vacuum chamber to said vacuum port when the engine vacuum falls below said predetermined negative pressure whereby when the engine is started and the engine vacuum transmitted to the vacuum port is above said predetermined negative pressure the check valve opens while the bleed valve closes to establish the same engine vacuum in the first vacuum chamber and thereby close the vent valve but whenever the engine vacuum thereafter drops below the predetermined negative pressure while the engine is running the check valve closes while the bleed valve remains closed to trap the engine vacuum in the first vacuum chamber at a pressure above the predetermined negative pressure to maintain closure of the vent valve until either the engine vacuum rises above the predetermined negative pressure to thereby maintain the vent valve closed or the engine is shutoff and there is no engine vacuum at the vacuum port whereafter the bleed valve opens to establish atmospheric pressure in the first vacuum chamber and thereby permit movement of the vent valve to its open position by the spring bias.

9. In an evaporative emission control system for an internal combustion engine supplied with air-fuel mixture by a carburetor having a fuel bowl, fuel vapor storage means for collecting and storing fuel vapor for later burning in the engine, and a vacuum operated fuel bowl vapor vent valve arrangement for controlling communication between the carburetor fuel bowl and said storage means comprising a housing having an inlet adapted to receive fuel vapor from the carburetor fuel bowl, an outlet connected to deliver fuel vapor to said fuel vapor storage means, a vacuum port and a bleed port that is open to atmosphere, a vent valve mounted in said housing for movement between an open position opening said inlet to said outlet to permit fuel vapor flow to said storage means and a closed position closing said outlet to said inlet to prevent such flow, a spring arranged in said housing to bias said vent valve to its open position, a first vacuum chamber in said housing defined in part by a first diaphragm that is exposed to atmosphere and is connected to said vent valve, said first diaphragm being responsive to the presence of engine vacuum in said first vacuum chamber above a predetermined negative pressure to urge said vent valve to its closed position against the spring bias, a bleed valve mounted in said housing for movement between an open position opening said bleed port to said first vacuum chamber and a closed position closing said first vacuum chamber to said bleed port, a second vacuum chamber in said housing open to said vacuum port and defined in part by a second diaphragm that is exposed to atmosphere and is integrally connected to said bleed valve, said second diaphragm in the absence of vacuum in said second vacuum chamber locating said bleed valve in its open position and being responsive to the establishment of engine vacuum in said second vacuum chamber above and also below said predetermined negative pressure to move said bleed valve to its closed position, and a check valve integral with said second diaphragm responsive to engine vacuum at said vacuum port to open said first vacuum chamber to said vacuum port when the engine vacuum rises above said predetermined negative pressure and to close said first vacuum chamber to said vacuum port when the engine vacuum falls below said predetermined negative pressure whereby when the engine is started and the engine vacuum transmitted to the vacuum port is above said predetermined negative pressure the check valve opens while the bleed valve closes to establish the same engine vacuum in the first vacuum chamber and thereby close the vent valve but whenever the engine vacuum thereafter drops below the predetermined negative pressure while the engine is running the check valve closes while the bleed valve remains closed to trap the engine vacuum in the first vacuum chamber at a pressure above the predetermined negative pressure to maintain closure of the vent valve until either the engine vacuum rises above the predetermined negative pressure to thereby maintain the vent valve closed or the engine is shutoff and there is no engine vacuum at the vacuum port whereafter the bleed valve opens to establish atmospheric pressure in the first vacuum chamber and thereby permit movement of the vent valve to its open position by the spring bias.

* * * * *